Patented July 26, 1932

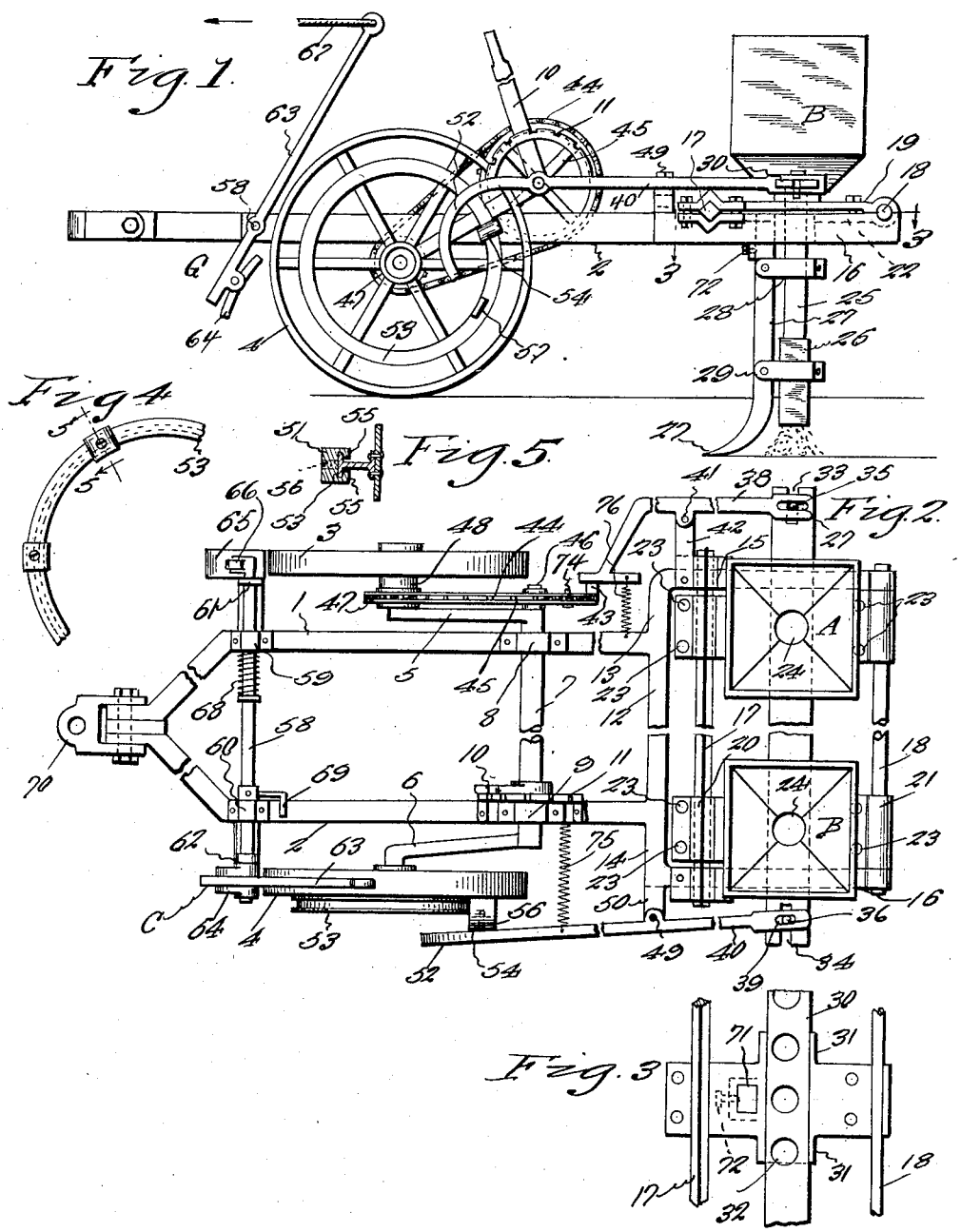

1,868,588

UNITED STATES PATENT OFFICE

MANUEL ROMERA, OF CASTROVILLE, CALIFORNIA, ASSIGNOR OF ONE-THIRD TO EMILIO GUIRIATO AND ONE-THIRD TO ETTORE GUIRIATO, BOTH OF CASTROVILLE, CALIFORNIA

AUTOMATIC FERTILIZER DISTRIBUTING APPARATUS

Application filed August 23, 1930. Serial No. 477,448.

My invention relates to improvements in agricultural implements, and it consists in the combinations, constructions and arrangements hereinafter described and claimed.

More particularly my invention relates to a fertilizer distributer adapted for distributing fertilizer in powdered form in quantified units. For the purpose of this specification I have illustrated my invention in conjunction with a sub-soil plow, although obviously it could be used in other connection and for purposes other than the distribution of fertilizer, seed for instance.

The objects of my invention comprise the following desiderata:—

To provide a suitable frame structure carrying a sub-soil plow capable of opening up deep grooves in the soil; the implement having ground-engaging wheels which are preferably mounted on cranks attached to the frame and arranged to carry the implement at different levels with respect to the ground plane. The implement is tractor-drawn and automatic in its functions so as to do its work while being drawn along by the tractor. The operator of the tractor having full control of the implement.

To provide hopper means adapted to hold a supply of fertilizer and means to discharge the fertilizer deep down in the groove immediately behind the plow either in a continuous stream or intermittently.

To provide means to regulate the quantity of fertilizer being fed.

To provide dual hoppers and means to space them at different distances apart so that fertilizer units may be deposited in rows of different widths.

To provide duct means leading from each hopper and extending downwardly behind said plow, and cut-off means arranged to open and shut at different periods.

To provide means carried by a ground-engaging wheel to regulate the periodicity of the intermittent feed when the distance traveled is less than one revolution of said wheel: for example, if the circumference of the wheel should be ten feet, periods of feed may be arranged so as to actuate into any multiple thereof.

To provide means whereby one of said ground engaging wheels may be geared so as to actuate said cut-off to deliver units of fertilizer in periods extending over more than one revolution of said wheel, as would be required in orchard use where the trees to be fertilized are spaced long distances apart. In extreme cases with trees thirty feet apart said wheel would be arranged to trip the cut-off ever third revolution.

To provide means to lock said ground-engaging wheels to enable the implement to skid into the proper position to commence the discharge of fertilizer units opposite the plants comprising the row; together with further objects and advantages that will appear, be particularly pointed out in the claims and illustrated in the accompanying drawing, in which:—

Figure 1 is a side elevational view of my invention.

Figure 2 is a top plan view.

Figure 3 is a top plan view along the line III—III of Figure 1.

Figure 4 is a fragmentary side elevational view of the spacing element.

Figure 5 is a sectional view taken on the line V—V of Figure 4.

Similar indicia of reference refer to similar parts throughout the several views.

In carrying out my invention I provide a frame comprising the two side members 1 and 2.

These members are spaced from each other by any suitable bracing (not shown) and they are movably supported on the ground engaging wheels 3 and 4, said wheels being mounted on the cranks 5 and 6 which extend from opposite ends of the main shaft 7 journaled in the bearings 8 and 9.

It will be noted that said shaft is provided with the lever 10 arranged to cooperate with the detent element 11 for movement of said cranks to depress or elevate said frame.

In Figure 2 it is shown that the member 12 extends across said frame and has the parts 13 and 14 projecting therefrom, said parts being turned backwardly to form the respective parallel frame members 15 and 16.

The bar 17 extends across from one said frame member to the other adjacent the rear of said transverse member and the bar 18 extends across similarly at the rear end of said frame members so as to provide parallel bars for the support of the respective hoppers A and B.

The bar 17 is shown of square section, whereas, the bar 18 is shown round, but both may be either round or square.

The hoppers A and B are both alike, and each is provided with the base 19 which bridges across from said bar to bar, the respective ends 20 and 21 being hollowed to fit the upper surfaces of the respective bars for slidable movement thereon. The depths of said hollows being suitably less than the thickness of said bars to admit of clamping in fixed position when the complemental base member 22 provided with counterpart hollows is rigidly clamped thereto by tightening the bolts 23.

Both hoppers are substantially funnel-shaped, the bottoms thereof taper down to the opening 24 which leads down to the duct 25 which telescopes into the suitably larger duct 26, both of which are situated behind the stem of the plow 27 and are suitably fastened thereto by the respective clamps 28 and 29; an arrangement whereby the duct 26 may be set at various heights for discharge of fertilizer at various levels in the groove produced by said plow.

It will be noted that by having the lesser duct above, and the larger below there is no interior ledge presented for matter to clog upon.

By reference to Figures 1 and 2 it is seen that the multi-ported cut-off member 30 passes through the lower end of both said hoppers, being slidably mounted in the ways 31, well shown in Figure 3. The various ports 32 are spaced to open and close the ducts 25 when the hoppers are disposed at different settings on the bars 17 and 18.

The respective ends of said cut-off member are provided with slots as 33 and 34, the respective axially-adjustable stud-bolts 35 and 36 are mounted for axial adjustment in said respective slots. The elongated slot 27 of the lever 38 engages the stud 35, whereas, the elongated slot 39 of the lever 40 engages the stud 36.

The lever 38 extends forwardly to the pivot 41 carried by the bracket 42 and thence extends to engage the trip-link 43 carried by the chain 44 connecting the idle sprocket 45 mounted on the stud 46 co-axial with said main shaft. Said chain being driven by the sprocket 47 fast to the interior hub 48 of the wheel 3.

The lever 40 extends to pivot at 49 on the bracket 50 and thence forwardly to connect with the trip-boss 54 revoluble with the wheel 4.

By reference to Figure 1 it will be seen that the free end of the lever 40 terminates in the downwardly extended curve 52 thus adapting said lever to coact with a trip-boss revolved around a center adapted to be stationed at different levels, such as is presented when the cranks 5 and 6 are moved to different settings relative to the ground plane. Said curve being so arranged that no matter what practical setting the cranks may have, a given trip-boss will make one engagement therewith in each revolution of said wheel.

The wheel 4 is shown as having but one said trip-boss, but in practice there may be many; for instance, if the wheel be ten feet in circumference and it is desired to make deposits of fertilizer two feet apart, five trip-bosses are employed.

In Figure 1, I have shown the ring-like structure 53 carried by the outer side of the wheel 4.

By reference to Figure 5 it will be seen that said structure resembles an I-beam formed into a ring so as to expose the flats thereof. The trip-boss shown in connection therewith is seen to comprise the boss 54, the incurved lugs 55 and 55 adapted to engage the under surfaces of the adjacent flat, and the sunken set-screw 56 adapted to set the boss securely in the required position with respect to the circumference of said ring. It should be observed that a section of the outer flat of the structure has been cut away at 57 for assembling the bosses on the structure.

In Figures 1 and 2 it will be noted that the implement is provided with the brake element C adapted to lock both the wheels 3 and 4 against rotation. Said element comprising the transverse rock-shaft 58, mounted in the bearings 59 and 60 attached to the frame 1 and 2 and in the brackets 61 and 62 respectively extending therefrom.

The lever 63, fast to said shaft adjacent the bracket 62 carries the shoe 64 arranged to coact against the surface of the wheel 4, whereas, the shoe 65 carried by the crank 66 is arranged to coact against the wheel 3, said actuation being effected by a forward pull of the line 67 by the operator of the implied tractor; the spring 68 serves to pull said lever back when out of operation, while the bumper 69 prevents said lever falling too far back.

The implement is drawn by the clevis 70.

In order to operate my implement, the plow 27 is secured in the socket 71 by the setscrew 72. The implement is then set to run at the required depth by manipulation of the lever 10 which sets the cranks 5 and 6 to elevate or depress the frame.

Next it is necessary to determine the distance apart to set the hoppers with relation to the central axis of the implement which is done by slackening the bolts 23 and sliding the hoppers on the bars 17 and 18 to the correct spacing and then tightening said bolts, which operation sets said hoppers in position.

The next is to determine the spacing of the individual discharges in relation to the circumference of said wheel 4.

If the spacing is to be less than said circumference, more of said trip-bosses must be employed; in which case the chain 44 and the lever 38 must be removed by withdrawing the coupling-pin 74 normally connecting ends of the chain 44 and the pivot at 41 for the lever 38.

If however, the distance apart of the discharges is greater than said wheel circumference, then, in such event, the chain and associated parts must be retained and the lever 40 removed.

It should be noted that the quantity of fertilizer discharged at each actuation of said cut-off can be reduced to suit by manipulation of the studs 35 and 36 in their respective slots thereby effecting less than full registry of said ports with said ducts. which is easier than moving the hoppers to effect the reduction. In operation, the trip-boss or the trip-link, as the case may be, moves the associated lever outward when contacting therewith, thereby traversing said cut-off member from the closed to the open position. As soon as the boss passes the curve 52 of the lever 40 the spring 75 retracts said lever and closes both the respective ports 32 and 32.

The spring 76 functions in a similar manner in relation to the lever 38.

It should be explained that when turning headlands the brake element C has to be applied to prevent rotation of the respective wheels 3 and 4 thereby arresting the feed mechanism until the element is traversed to the proper starting position in relation to the plants to be fertilized, whereupon slackening of the line 67 releases said brake elements and enables the implement to function.

It is believed that the construction, operation and advantages of the invention will now be clearly understood. The present embodiments of the invention have been disclosed in detail merely by way of example, since in actual practice they attain the features of advantage set forth as objects in the statement of the invention and the above description.

Numerous changes in the details of construction, and in the combination and arrangement of parts may be resorted to without departing from the spirit or scope of the invention as hereinafter claimed or sacrificing any of its advantages.

Having thus described my invention, what I claim as new is:—

1. In an implement of the kind described arranged for traverse on ground-engaging supporting wheels, a structural frame, axially parallel frame members disposed rearwardly of the frame, transverse parallel bars bridging the rear frame members, plate supports slidable at their ends on the parallel bars, a hopper on each plate support, and means arranged to lock said plate supports to said bars at suitable points relative to the axis of the implement.

2. In an implement as described in claim 1, said hopper elements provided with a port communicating with a downwardly-disposed duct, a cup-off means cooperative with said port and duct, said cut-off provided with openings suitably spaced apart to open and close said port when traversed thereover and means for controlling the degree of registry of the openings in the cutoff with the port and duct.

3. In an implement as set forth in claim 1, said plate members arranged to slide on said parallel bars, complemental subjacent base members arranged to grip the under surfaces of said bars and means to clamp said bases and complement bases rigidly to said bars.

4. In an implement as specified in claim 1, said hoppers bridging from bar to bar provided with port means, duct means complemental to said port and carried by a subjacent base, a cut-off means arranged to open and close said port, a plow stem carried by said subjacent base, and means securing said ducts releasably to said stem at the rear thereof.

5. In an implement of the kind described, comprising a structural frame and means arranged to hold dispensable matter, means to dispense said matter, ground-engaging wheels supporting said frame, a circular rim track secured to one wheel and revoluble therewith, trip elements slidable and spaceable on said rim track and arranged to coact with said dispensing means, means attaching said elements to said rim track, and means to lock said elements to said rim track when spaced.

In testimony whereof I affix my signature this 12th day of August, 1930.

MANUEL ROMERA.